United States Patent [19]
Fujiwara et al.

[11] Patent Number: 5,274,496
[45] Date of Patent: Dec. 28, 1993

[54] OPTICAL AMPLIFYING REPEATER WITH MONITOR AND CONTROL FUNCTION

[75] Inventors: Haruo Fujiwara; Takashi Miyazaki, both of Kawasaki, Japan

[73] Assignee: Fujitsu Limited, Kawasaki, Japan

[21] Appl. No.: 6,723

[22] Filed: Jan. 21, 1993

[30] Foreign Application Priority Data

Jan. 20, 1992 [JP] Japan .................................. 4-007098

[51] Int. Cl.⁵ ..................... H04B 10/02; H04B 10/16; H04B 17/02
[52] U.S. Cl. ................................. 359/177; 370/13.1; 375/3; 340/425
[58] Field of Search .............. 359/177; 370/13.1, 13.3; 375/3; 340/425

[56] References Cited

U.S. PATENT DOCUMENTS

| | | | |
|---|---|---|---|
| 5,121,043 | 6/1992 | Kerkman et al. | 318/805 |
| 5,162,936 | 11/1992 | Taga et al. | 359/177 |

FOREIGN PATENT DOCUMENTS

| | | |
|---|---|---|
| 59-183543 | 10/1984 | Japan . |
| 2-270427 | 11/1990 | Japan . |
| 3-205929 | 9/1991 | Japan . |
| 3-242053 | 10/1991 | Japan . |
| 3-270520 | 12/1991 | Japan . |
| 4-8023 | 1/1992 | Japan . |
| 4-003028 | 8/1992 | Japan . |
| 2242091 | 9/1991 | United Kingdom . |

OTHER PUBLICATIONS

Shimoyamada et al, Fujitsu, vol. 40, #4, pp. 188-196, 1989.
Hakamada et al, Trans. Inst. Electron. & Commun. Eng. Jpn., Part B, vol./66B, #9, pp. 1147-1154, Sep. 1983.
Electronic Letters, vol. 27, No. 3, Jan. 1991, Stevenage GB, pp. 193-195, A. D. Ellis et al. "Automatic Gain Control in Cascaded Erbium Doped Fibre Amplifier Systems".

*Primary Examiner*—Nelson Moskowitz

[57] ABSTRACT

An optical amplifying repeater having a monitor and control function maintaining the index of modulation of a response signal relative to the main signal to be constant. The optical amplifying repeater includes a monitor and control portion for outputting the response signal in response to a supervisory control signal, a pair of erbium-doped fibers for optically amplifying an input optical signal by stimulating action of a pumping laser diode and outputting the amplified optical signal, a pair of optical output stabilization portions for outputting a DC current $I_{DC}$ driving the pumping laser diode such that the optical output level of the erbium-doped fiber becomes constant, and a pair of amplification portions supplied with the response signal output from the monitor and control portion for outputting an AC current $I_{AC}$ driving the pumping laser diode. The optical amplifying repeater further includes a pair of gain control portions for outputting a control signal $V_{CONT}$ controlling the gain of each of the amplification portions such that the DC current $I_{DC}$ and the AC current $I_{AC}$ Satisfy the relationship $I_{AC} = a \times I_{DC} + b$ (a, b: constants). With such arrangement, the main signal and the response signal are amplified at the same rate and, hence, the index of modulation of the response signal component relative to the main signal can be kept virtually constant even when there is produced a change in the input signal level to the optical amplifying repeater, the temperature of the same, and the like.

4 Claims, 3 Drawing Sheets

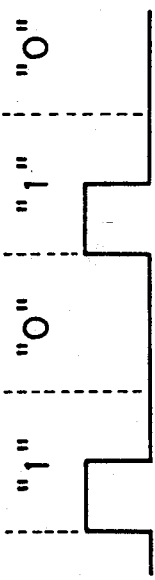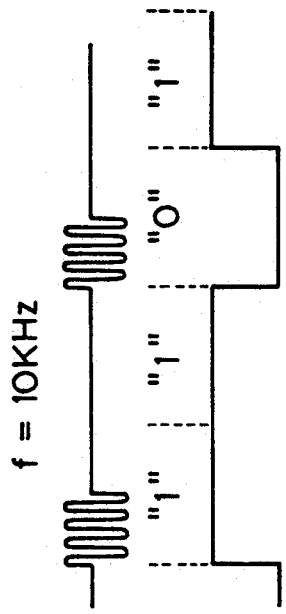
FIG. 2A
FIG. 2B
FIG. 2C
FIG. 2D
FIG. 2E

OPTICAL AMPLIFYING REPEATER WITH MONITOR AND CONTROL FUNCTION

BACKGROUND OF THE INVENTION

1. Field of the Invention

The present invention generally relates to supervisory control of an optical amplifying repeater using erbium-doped fibers and, more particularly, relates to a structure of a modulator circuit which monitors the operating state of a repeater and superposes a response signal as to the monitored state on the main signal to thereby inform the terminal station of the operating state.

2. Description of the Related Art

An optical amplifier directly amplifying an optical signal as it is, without converting the optical signal into an electrical signal, is substantially bit rate-free and has such features that it facilitates construction of a large-capacity system and enables multiple channels to be amplified en bloc. Because of such features, intensive studies are being made in various research institutions on the optical amplifier as one of the key devices in the optical communication system for future. As one of the types of such optical amplifier, an optical fiber amplifier using an optical fiber, chiefly the core of which is doped with a rare earth element or ion (such as Er, Nd, and Yb), is receiving keen interest. The optical fiber amplifier has such excellent characteristics that it provides high gain, its gain is not dependent on polarization, it produces low noise, and it incurs little connection loss at its connection with an optical fiber as a transmission line.

There has been made an attempt to construct a long-distance optical communication system by disposing a plurality of optical fiber amplifiers of the described type in an optical transmission line at intervals of a predetermined distance so that an optical signal is directly amplified by optical amplifying repeaters constituted of the optical fiber amplifiers inserted in the optical transmission line. When constructing such an optical communication system, it is preferable that a terminal station connected with the optical transmission line monitors the operating state of each optical amplifying repeater and executes necessary control of each optical amplifying repeater. In response to a supervisory signal output from the terminal station, a response signal indicative of the operating state of the repeater is sent back superposed on the main signal to the terminal station. Then, since the response signal is superposed on the main signal, there arises the need for an optical amplifying repeater including a modulator circuit which is capable of keeping the index of modulation of the response signal relative to the main signal virtually constant.

Referring to FIG. 1, in which a block diagram of a prior art repeater circuit is shown, reference numeral 10 denotes a repeater circuit for the up transmission line and 10' denotes a repeater circuit for the down transmission line. Signal light formed of the main signal and a supervisory control signal superposed thereon transmitted over the up transmission line 11 is input to an erbium-doped fiber 1. Pumping light from a pumping laser diode 6 is reflected by a wavelength division multiplexer 2 and enters the erbium-doped fiber and, thereby, the signal light is amplified in the erbium-doped fiber 1. The thus amplified signal light is transmitted through the wavelength division multiplexer 2 and most of it is transmitted through a beam splitter 3 to be output to the optical transmission line 11. A portion of the signal light is branched by the beam splitter 3 and enters a photodiode 4 and, therein, the optical signal is converted into an electric signal. The electric signal from the photodiode 4 is input to an optical output stabilizer circuit 5 and also input to a bandpass filter 8 whose center frequency is fl.

Only a subcarrier at a frequency fl (for example 10 MHz) modulated by the supervisory control signal is extracted through the bandpass filter 8 and input to a monitor and control circuit 9. In the monitor and control circuit 9, the subcarrier is demodulated and, thereby, the supervisory control signal transmitted from the terminal station, not shown, is reproduced. According to the supervisory control signal, input and output levels of the optical amplifying repeater are monitored, the driving current of the pumping laser diode 6 is monitored, the temperature of the repeater is monitored, the currently used pumping laser diode 6 is switched to a backup, and optical loopback is performed.

Further, the monitor and control circuit 9, in response to the supervisory control signal, generates a response signal for example at a frequency of 50 b/s and in an RZ format as shown in FIG. 2A. Further, it modulates, with the response signal, a sinusoidal signal output from an oscillator 12 generating the sinusoidal signal for example at a frequency of 10 KHz as shown in FIG. 2B, and inputs the modulated signal to a variable gain amplifier 7' through a monitor and control circuit 9' for the down transmission line. The variable gain amplifier 7' amplifies the input signal with a preset gain ($G_2$) and outputs the amplified signal as an alternating current $I_{AC}$ for driving a pumping laser diode 6'.

Meanwhile, signal light input from the down optical transmission line 11' is supplied to an erbium-doped fiber 1' having optical amplifying function and this signal light is amplified by stimulated emission of radiation caused by the pumping from the pumping laser diode 6'. The thus amplified signal light is transmitted through a wavelength division multiplexer 2' and most of it is further transmitted through a beam splitter 3' to be output to the optical transmission line 11'. A portion of the signal light is branched by the beam splitter 3' and input to a photodiode 4' to be converted into an electric signal. The electric signal from the photodiode 4' is input to an optical output stabilizer circuit 5' and also input to a bandpass filter 8' whose center frequency is fl.

In the optical output stabilizer circuit 5', the average value of the input signal is obtained and this average value is compared with a preset reference value to obtain the difference therebetween, and a DC current $I_{DC}$ proportional to the voltage of the difference, for driving the pumping laser diode 6', is output. Further, an AC current $I_{AC}$ in accordance with the response signal is superposed on the DC current $I_{DC}$ and, with this current, the pumping laser diode 6' is driven. The pumping light output from the pumping laser diode 6' is input to the wavelength division multiplexer 2'.

Now, we suppose that for example the wavelengths of the signal light transmitted over the up and down optical transmission lines are each 1.55 micrometer, the wavelengths of the signal light from the pumping diodes 6 and 6' are each 1.48 micrometer, and both the wavelength division multiplexers 2 and 2' have characteristics to transmit light of a 1.55 micrometer band therethrough and reflect light of the wavelength of 1.48 micrometer. Then, the signal light input from the down optical transmission line 11' is transmitted through the wavelength division multiplexer 2' and input to the beam splitter 3' and, then, most of it is transmitted through the beam splitter 3' and a portion of it is reflected from the same. The pumping light from the pumping laser diode 6' is reflected by the wavelength division multiplexer 2' and introduced into the erbium-doped fiber 1'.

In the erbium-doped fiber 1', the signal light is optically amplified by the pumping light output from the pumping laser diode 6'. In this case, the main signal of the signal light input from the down transmission line 11' is for example a signal modulated in an NRZ format at a frequency of 2.5 Gb/s as shown in FIG. 2C, which, when the range of the time base is set to be on the order of milli second, is expressed as schematically shown in FIG. 2D.

The modulated wave (whose amplitude is denoted by B) by the above described response signal is superposed on the main signal (whose amplitude is denoted by A) as shown in FIG. 2E and the signal light is optically amplified with the index of modulation of the response signal component relative to the main signal set for example to 1%. Then, by means of the feedback loop through an optical output stabilizer circuit 5', the level of the output light of the optical amplifier using the erbium-doped fiber 1' is kept constant and, at the same time, the amplitude of the response signal superposed on the main signal is kept constant, and thus the response signal is returned, through the down transmission line 11', to the terminal station (not shown) which transmitted the supervisory control signal.

In the above described prior art repeater circuit, however, in order to maintain the output light level of the optical amplifying repeater to be constant, a portion of the output light is monitored, and the power of the output light of the pumping laser diode is controlled as well as the gain of the erbium-doped fiber is controlled such that the monitored output light level is held constant. Consequently, when the amplitude of the modulated wave by the response signal is held constant, the index of modulation of the response signal component relative to the main signal will vary with a change in the level of the input signal to the optical amplifying repeater, a change in the temperature thereof, and the like.

More specifically, when the amplitude B of the modulated wave by the response signal is held constant, the DC current component $I_{DC}$ will vary with a change in the level of the input signal to the optical amplifying repeater and, thereby, the index of modulation of the response signal component relative to the main signal will vary Further, when the temperature is changed, the driving current (DC current component $I_{DC}$) versus output characteristics of the pumping laser diode will vary and, hence, the index of modulation of the response signal component relative to the main signal will vary. When the index of modulation of the response signal component relative to the main signal varies so much as to exceed a predetermined limit, there arises a problem that the terminal station becomes unable to receive the response signal.

SUMMARY OF THE INVENTION

Accordingly, an object of the present invention is to provide an optical amplifying repeater including a repeater circuit capable of keeping the index of modulation of the response signal, generated by the repeater in response to a supervisory control signal, relative to the main signal virtually constant.

In accordance with an aspect of the present invention, there is provided an optical amplifying repeater comprising a first and a second rare earth-doped fiber respectively connected with a first and a second optical transmission line, a first and a second pumping laser diode for inputting pumping light to the first and second rare earth-doped fibers, respectively, first and second photoelectric conversion means for converting a portion of output light input thereto from the first and second rare earth-doped fibers into an electric signal, respectively, first and second optical output stabilization means respectively connected with the first and second photoelectric conversion means for outputting the DC component ($I_{DC}$) of driving currents of the first and second pumping laser diodes such that the optical output level of the first and second rare earthdoped fibers becomes constant, monitor and control means supplied with a supervisory control signal component superposed on the main signal of an optical signal input from the first and second optical transmission lines for outputting a response signal component responding to the supervisory control signal component, and first and second amplification means for amplifying the response signal component input thereto from the monitor and control means and outputting the amplified response signal component as the AC component ($I_{AC}$) of the driving current for driving the first and second pumping laser diodes, characterized by first and second gain control means provided between the first and second amplification means and the first and second optical output stabilization means and supplied with the DC current component ($I_{DC}$) of the driving current output from each of the optical output stabilization means for outputting a control signal ($V_{CONT}$) for controlling the gain of each of the amplification means such that the DC component ($I_{DC}$) and the AC component ($I_{AC}$) of the driving current output from each of the amplification means satisfy the relationship $I_{AC} = a \times I_{DC} + b$ (a, b: constants).

According to the present invention, the main signal and the response signal are amplified at the same rate and, hence, the index of modulation of the response signal component relative to the main signal can be kept virtually constant even when there is produced a change in the input signal level to the optical amplifying repeater, the temperature of the same, and so on.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2A to FIG. 2E are diagrams explanatory of a modulation method of the main signal with a modulation signal in accordance with a response signal.

DESCRIPTION OF THE PREFERRED EMBODIMENTS

Figure 1:
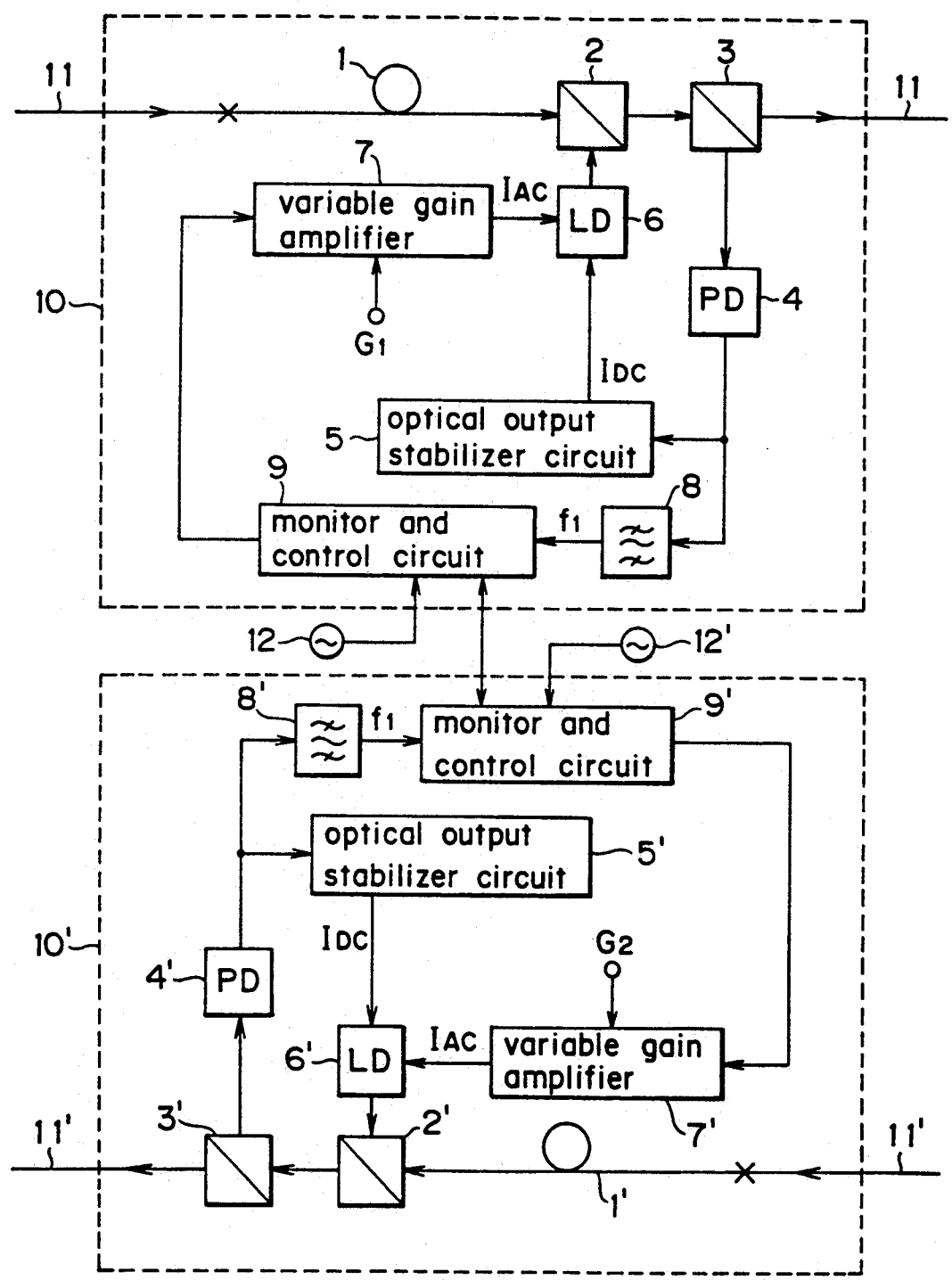
FIG. 1 is a block diagram showing structure of a prior art repeater circuit.

An embodiment of the present invention will be described below with reference to FIG. 3. In the description of the embodiment, elements which are substantially the same as those in the prior art example shown in FIG. 1 will be described denoted by corresponding reference numerals.

Figure 3:
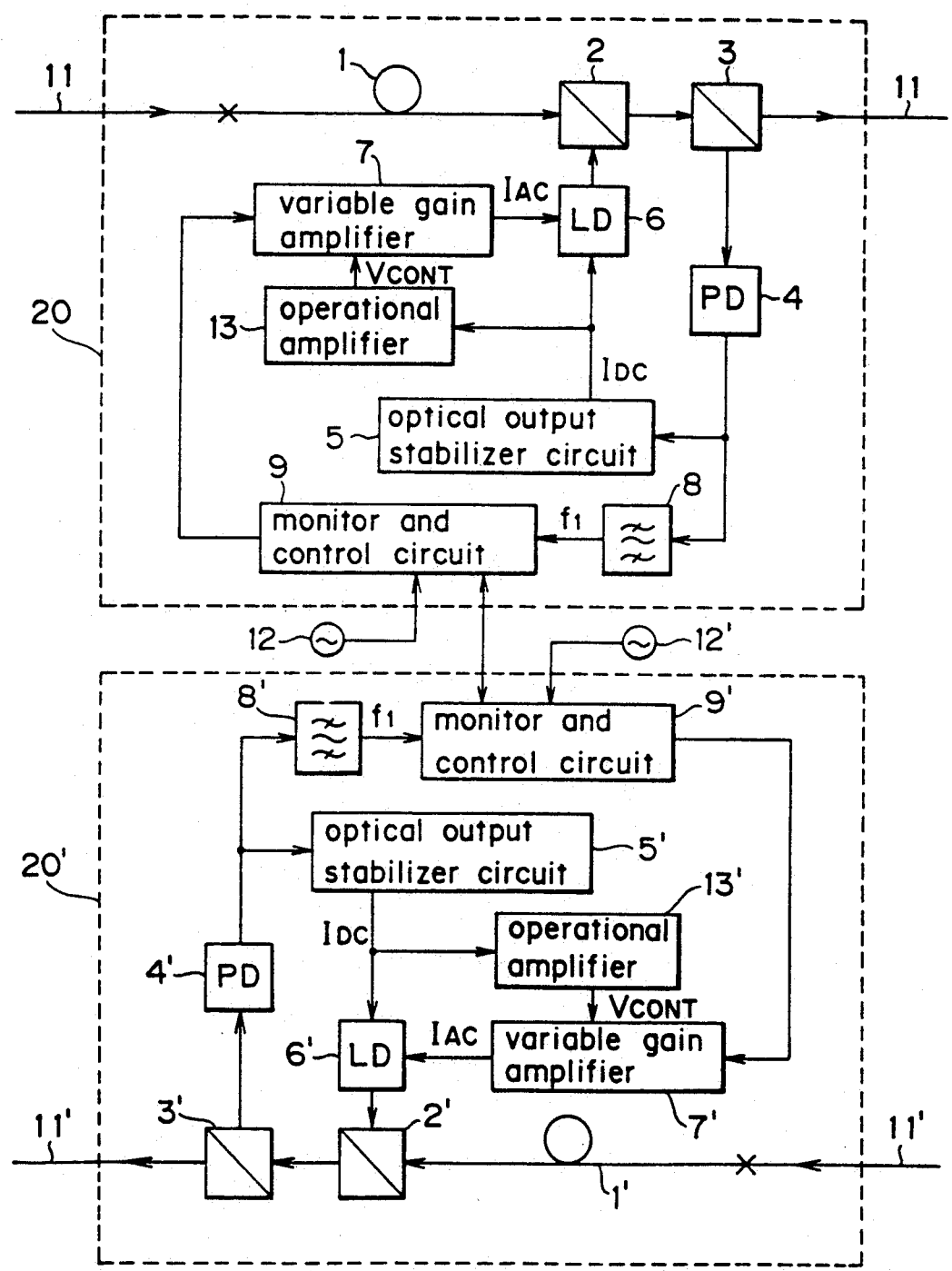
FIG. 3 is a block diagram showing structure of a repeater circuit according to an embodiment of the present invention.

Referring to FIG. 3, reference numeral 20 denotes a repeater circuit for the up transmission line and 20' denotes a repeater circuit for the down transmission line. Signal light constituted of a main signal and a supervisory control signal superposed thereon transmitted over the up optical transmission line 11 is input to an erbium-doped fiber 1. Pumping light output from a pumping laser diode 6 is reflected by a wavelength division multiplexer 2 and introduced into the erbium-doped fiber 1 and, thereby, erbium ions are excited to a higher energy level. When the signal light is input to the erbium-doped fiber 1, stimulated emission of light of the same wavelength as that of the signal light takes place in the erbium-doped fiber 1 and the signal light is thereby amplified.

The amplified signal light is transmitted through the wavelength division multiplexer 2 and most of the transmitted light is transmitted through the beam splitter 3 to be output to the optical transmission line 11. A portion of the signal light is branched by the beam splitter 3 and input to the photodiode 4 to be converted into an electric signal. The electric signal from the photodiode 4 is input to an optical output stabilizer circuit 5 and also input to a bandpass filter 8 whose center frequency is f1. In the bandpass filter 8, only the subcarrier at the frequency of f1 (for example 10 MHz) modulated by the supervisory control signal is extracted from the input electric signal and this subcarrier is input to a monitor and control circuit 9.

The monitor and control circuit 9 demodulates the subcarrier to thereby reproduce the supervisory control signal transmitted from the terminal station (not shown). According to this supervisory control signal, it monitors input and output levels of the optical amplifying repeater, monitors the driving current of the pumping laser diode 6, monitors the temperature of the repeater, switches the currently used pumping laser diode 6 to a backup, and performs optical loopback.

Further, the monitor and control circuit 9, in response to the supervisory control signal, generates a response signal for example at a frequency of 50 b/s and in an RZ format as shown in FIG. 2A. Further, it modulates, with the response signal, a sinusoidal signal output from an oscillator 12 generating the sinusoidal signal for example at a frequency of 10 KHz as shown in FIG. 2B, and inputs the modulated signal to a variable gain amplifier 7' through a monitor and control circuit 9' for the down transmission line.

Meanwhile, signal light input from the down optical transmission line 11' is input to an erbium-doped fiber 1' and the signal light is amplified by action of the pumping light output from a pumping laser diode 6'. The amplified signal light is transmitted through a wavelength division multiplexer 2' and most of the transmitted signal light is also transmitted through a beam splitter 3' to be output to the optical transmission line 11' A portion of the signal light reflected by the beam splitter 3' is input to a photodiode 4' to be converted into an electric signal. The electric signal from the photodiode 4' is input to an optical output stabilizer circuit 5' and also input to a bandpass filter 8' whose center frequency is f1.

The average value of the input signal is obtained in the optical output stabilizer circuit 5' and this average value is compared with a preset reference value and, thereby, the difference therebetween is obtained. The optical output stabilizer circuit 5' outputs a DC current $I_{DC}$ for driving the pumping laser diode 6' proportional to the voltage of the above difference value and inputs the current to the pumping laser diode 6' and also inputs it to an operational amplifier 13'.

In the operational amplifier 13', a control signal voltage $V_{CONT}$ relative to the voltage $V_{DC}$ corresponding to the current $I_{DC}$ satisfying the following expression is obtained by calculation $$V_{CONT}=(a \times V_{DC}+b)/c,$$

where a, b, c are constants, and the voltage $V_{CONT}$ is input to the variable gain amplifier 7'. In the variable gain amplifier 7', the gain for the sinusoidal signal at 10 KHz modulated by the response signal output from the monitor and control circuit 9 is controlled such that the voltage VAC corresponding to the AC component ($I_{AC}$) of the driving current Of the pumping laser diode 6' becomes $$V_{AC}=c \times V_{CONT}=a \times V_{DC}+b.$$

and outputs the AC component ($I_{AC}$) of the driving current, where a, b, and c are varied with each optical amplifying repeater and will be set to optimum values according to characteristics of each repeater.

The pumping laser diode 6' is driven by the driving current obtained by superposing the AC component ($I_{AC}$) on the DC component ($I_{DC}$). The output light from the pumping laser diode 6' is reflected by the wavelength division multiplexer 2' and input to the erbium-doped fiber 1', and, thereby, the signal light input from the down optical transmission line 11' is amplified and simultaneously the response signal component is amplified at the same ratio.

As a result, the response signal component is arranged to have its index of modulation relative to the main signal maintained to be virtually constant even when a change is produced in the input signal level to the optical amplifying repeater, the temperature of the same, and the like, and it is returned to the terminal station (not shown), which delivered the supervisory control signal, through the down optical transmission line 11'.

According to the present invention, since the response signal generated in response to the supervisory control signal and the main signal are amplified at the same rate, the index of modulation of the response signal component relative to the main signal can be maintained to be virtually constant even when a change is produced in the level of the input signal to the optical amplifying repeater, the temperature thereof, and the like.

What is claimed is:

1. An optical amplifying repeater comprising a first and a second rare earth-doped fiber respectively connected with a first and a second optical transmission line, a first and a second pumping laser diode for inputting pumping light to said first and second rare earth-doped fibers, respectively, first and second photoelectric conversion means for converting a portion of output light input thereto from said first and second rare earth-doped fibers into an electric signal, respectively, first and second optical output stabilization means respectively connected with said first and second photoelectric conversion means for outputting the DC component ($I_{DC}$) of driving currents of said first and second pumping laser diodes such that the optical output level of said first and second rare earth-doped fibers becomes constant, monitor and control means supplied with a supervisory control signal component superposed on the main signal of an optical signal input from said first and second optical transmission lines for outputting a response signal component responding to said supervisory control signal component, and first and second amplification means for amplifying the response signal component input thereto from said monitor and control means and outputting the amplified response signal component as the AC component ($I_{AC}$) of the driving current for driving said first and second pumping laser diodes, the improvement comprising first and second gain control means provided between said first and second amplification means and said first and second optical output stabilization means, respectively and supplied with the DC current component ($I_{DC}$) of the driving current output from each of said optical output stabilization means for outputting a control signal ($V_{CONT}$) for controlling the gain of each of said amplification means such that the DC component ($I_{DC}$) and the AC component ($I_{AC}$) of the driving current output from each of said amplification means satisfy the relationship $I_{AC} = a \times I_{DC} + b$ (a, b: constants).

2. An optical amplifying repeater according to claim 1, wherein the output of the response signal component responding to the supervisory control signal component input from one of said first and second optical transmission lines and received by said monitor and control means is superposed on the main signal of the optical signal input from the other of said first and second optical transmission lines so as to be transmitted over the other of said optical transmission lines.

3. An optical amplifying repeater according to claim 2, wherein said first and second gain control means are each formed of an operational amplifier.

4. An optical amplifying repeater according to claim 3, wherein said first and second rare earth-doped fibers are each formed of an erbium-doped fiber and said first and second photoelectric conversion means are each formed of a photodiode.

* * * * *